United States Patent [19]

Minamoto et al.

[11] Patent Number: 5,048,364

[45] Date of Patent: Sep. 17, 1991

[54] MOTOR-OPERATED TILT STEERING DEVICE

[75] Inventors: Noboru Minamoto; Yoshiyuki Nakamura; Hironori Kotani, all of Osaka, Japan

[73] Assignee: Koyo Seiko Co., Ltd., Osaka, Japan

[21] Appl. No.: 373,370

[22] Filed: Jun. 28, 1989

[30] Foreign Application Priority Data

Jul. 14, 1988 [JP] Japan .............................. 63-93567[U]

[51] Int. Cl.5 .............................................. B62D 1/18
[52] U.S. Cl. ........................................ 74/493; 280/775
[58] Field of Search ................... 74/495, 493; 280/775

[56] References Cited

U.S. PATENT DOCUMENTS

| | | | |
|---|---|---|---|
| 4,050,318 | 9/1977 | Wolf | 74/89.15 |
| 4,335,625 | 6/1982 | Nishikawa | 74/493 |
| 4,612,822 | 9/1986 | Nishikawa et al. | 74/493 |
| 4,633,732 | 1/1987 | Nishikawa et al. | 74/493 |
| 4,642,839 | 2/1987 | Urban | 15/256.53 |
| 4,691,587 | 9/1987 | Farrand et al. | 280/775 |
| 4,785,684 | 11/1988 | Nishikawa et al. | 74/493 |
| 4,787,260 | 11/1988 | Bailey | 74/89.15 |
| 4,878,394 | 11/1989 | Nakamura et al. | 74/493 |

FOREIGN PATENT DOCUMENTS

| | | | |
|---|---|---|---|
| 58-33571 | 2/1983 | Japan | 74/495 |
| 59-230861 | 12/1984 | Japan | 74/493 |

OTHER PUBLICATIONS

Abstract in English of the Soviet Union Patent No. 1,000,330, Date: Oct. 26, 1981.

Primary Examiner—Leslie A. Braun
Assistant Examiner—Scott Anchell
Attorney, Agent, or Firm—Armstrong, Nikaido, Marmelstein, Kubovcik & Murray

[57] ABSTRACT

A motor-operated tilt steering device including a fixed bracket fixed to the body of a vehicle and supporting a lower steering shaft by means of a lower column, a tilt bracket pivotally movably attached to the fixed bracket and supporting by an upper column an upper steering shaft connected to the lower steering shaft by a universal joint, a tilting electric motor attached to the fixed bracket, and an arrangement for converting the rotation of the motor to a pivotal movement of the tilt bracket. The conversion arrangement includes a screw shaft attached to the fixed bracket in parallel with the motor, a timing belt coupling the motor to the screw shaft, a screw nut in meshing engagement with the screw shaft, and an eccentric member coupling the screw nut to the tilt bracket.

3 Claims, 6 Drawing Sheets

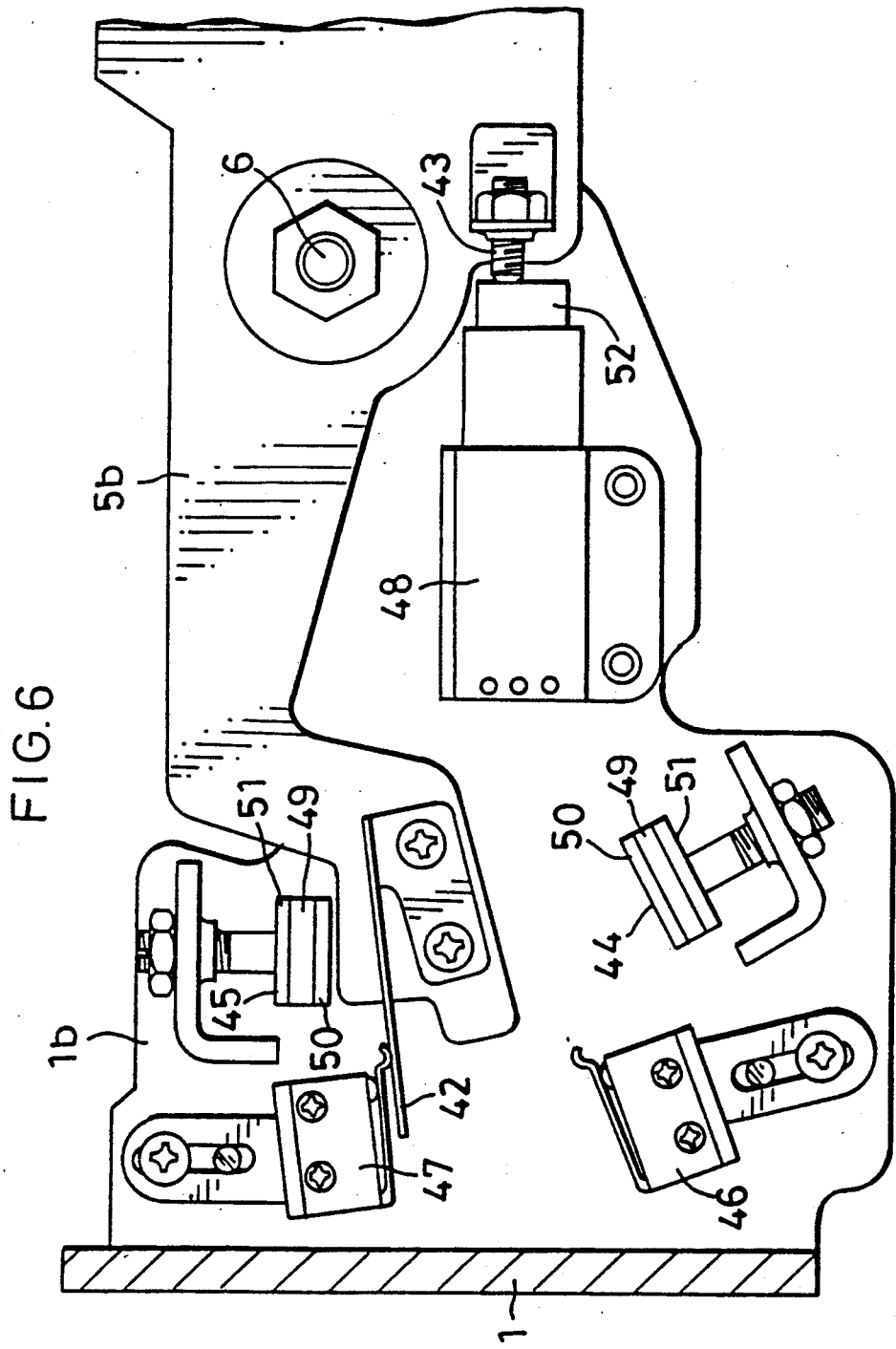

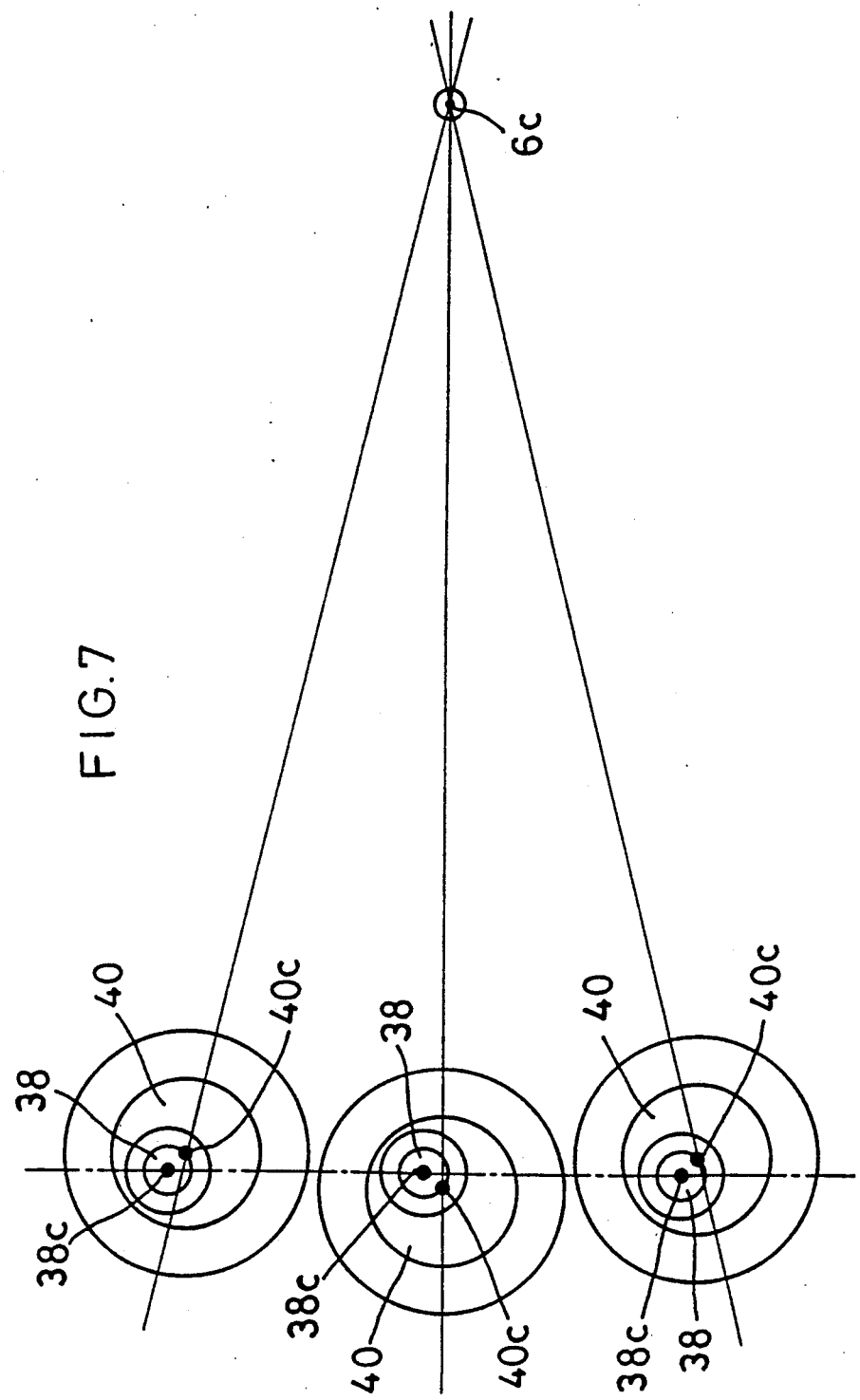

MOTOR-OPERATED TILT STEERING DEVICE

BACKGROUND OF THE INVENTION

The present invention relates to a tilt steering device which is operable by an electric motor for use in motor vehicles and the like.

Conventional tilt steering devices of the type mentioned include those which comprise a bracket fixed to the body of a vehicle, a tilt bracket pivoted to the fixed bracket, and a tilting electric motor mounted on the fixed bracket for pivotally moving the tilt bracket with its rotation. A lower steering shaft is supported by a lower column on the fixed bracket, and an upper steering shaft by an upper column on the tilt bracket. The lower steering shaft is connected to the upper steering shaft by a universal joint, the center of which is positioned on the center line of the pivot for supporting the tilt bracket. A steering wheel is attached to the upper end of the upper steering shaft. The motor, when driven, pivotally moves the tilt bracket, thereby shifting the steering wheel.

With the tilt steering device described, it is required to reduce the speed of rotation of the motor and further convert the rotation to the pivotal movement of the tilt bracket. Conventionally, gears are used for the speed reduction. The gear reduction means therefore gives off a great noise and has the problem that the gears and other components must be prepared with high precision. Moreover, there is the problem that when the steering wheel is loaded, the force is transmitted to the drive side to reversely rotate the motor.

SUMMARY OF THE INVENTION

The main object of the present invention is to overcome the above problems and to provide a motor-operated tilt steering device which is operable with a diminished noise and free of the likelihood that the motor will be rotated reversely.

To fulfill the above object, the invention provides a motor-operated tilt steering device including a fixed bracket fixed to the body of a vehicle and supporting a lower steering shaft by means of a lower column, a tilt bracket pivotally movably attached to the fixed bracket and supporting by an upper column an upper steering shaft connected to the lower steering shaft by a universal joint, a tilting electric motor attached to the fixed bracket, and conversion means for converting the rotation of the motor to the pivotal movement of the tilt bracket, the device being characterized in that the conversion means comprises a screw shaft attached to the fixed bracket in parallel to the motor, a timing belt coupling the motor to the screw shaft, a screw nut in meshing engagement with the screw shaft, and an eccentric member coupling the screw nut to the tilt bracket.

With the tilt steering device of the present invention, the rotation of the electric motor is subjected to a speed reduction by the timing belt. This diminishes the noise to be produced during operation. With use of the belt, the components of the reduction means need not be prepared with high precision, so that the device can be produced in quantities at a reduced cost. The arrangement wherein the rotation of the motor is converted to the pivotal movement of the tilt bracket by the screw nut and the screw shaft obviates the likelihood that the motor will be rotated reversely even when the steering wheel is loaded.

BRIEF DESCRIPTION OF THE DRAWINGS

FIG. 6 is an enlarged view in section taken along the line 6—6 in FIG. 1; and

FIG. 7 is a side elevation for illustrating the operation of eccentric disks.

DESCRIPTION OF THE PREFERRED EMBODIMENT

The invention will be described below in greater detail with reference to the accompanying drawings.

Figure 1:
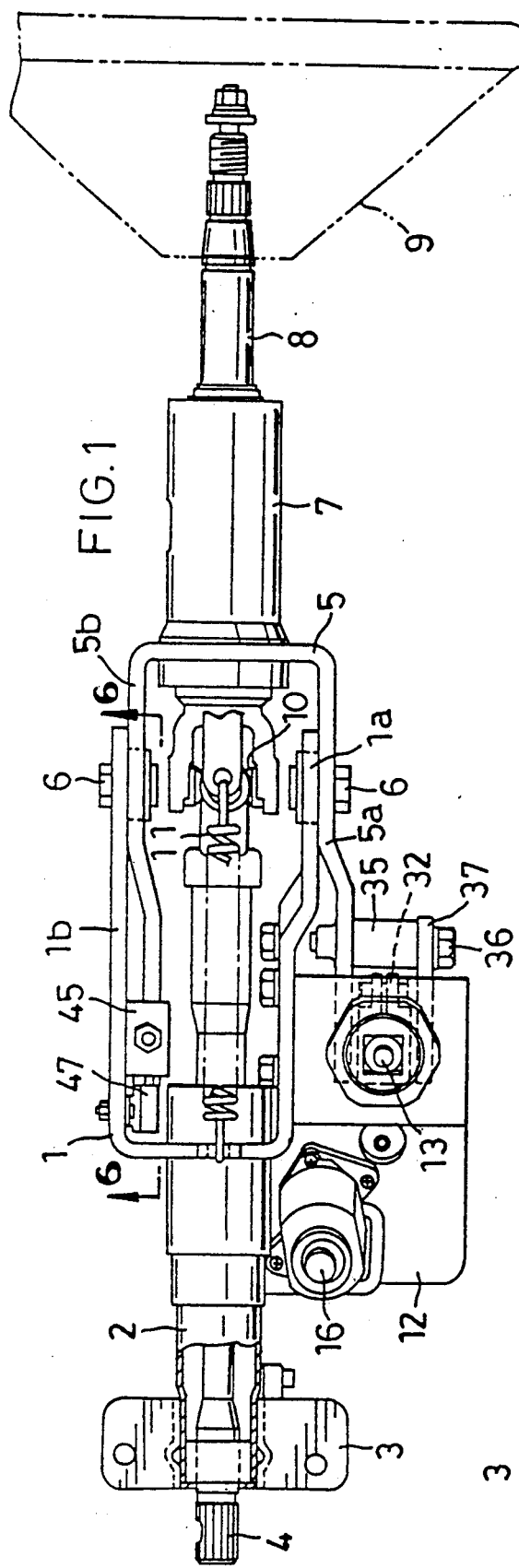
FIG. 1 is a plan view partly broken away and showing a tilt steering device embodying the invention.
Figure 2:
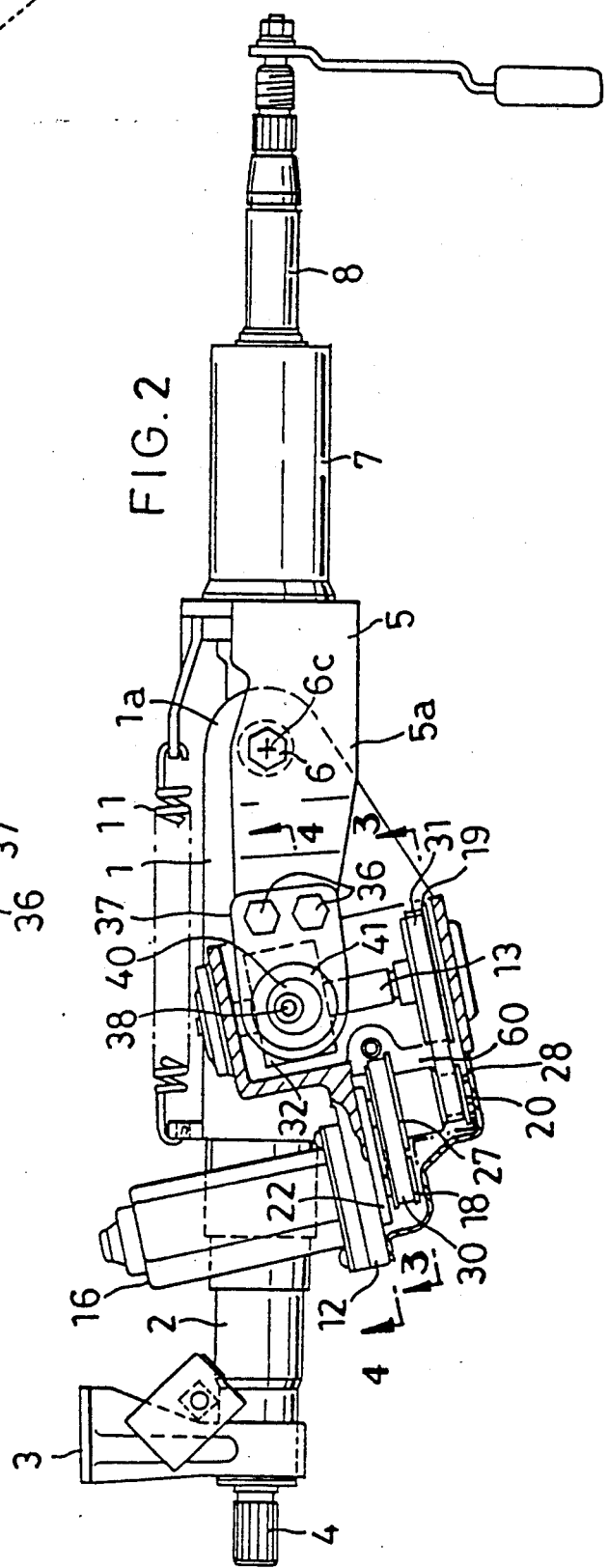
FIG. 2 is a side elevation partly broken away and showing the same.
Figure 3:
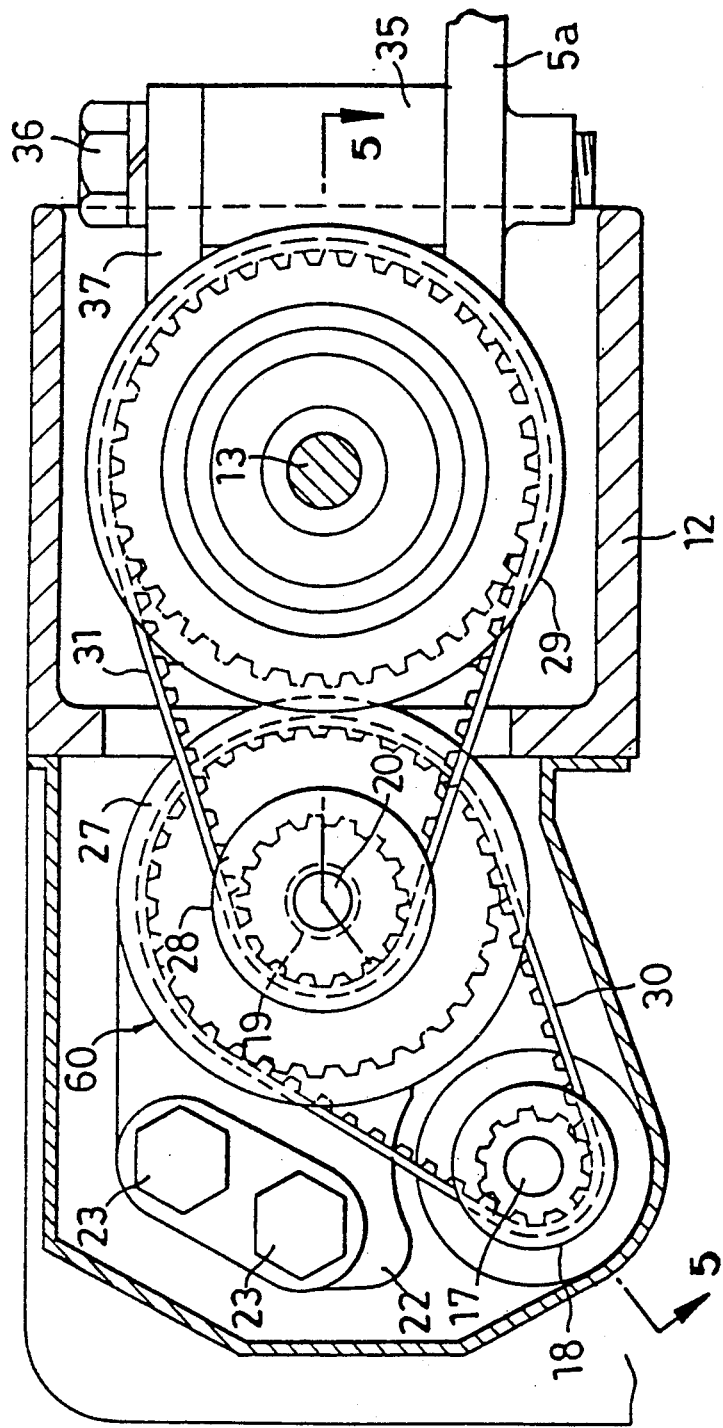
FIG. 3 is an enlarged view in section taken along the line 3—3 in FIG. 2.
Figure 4:
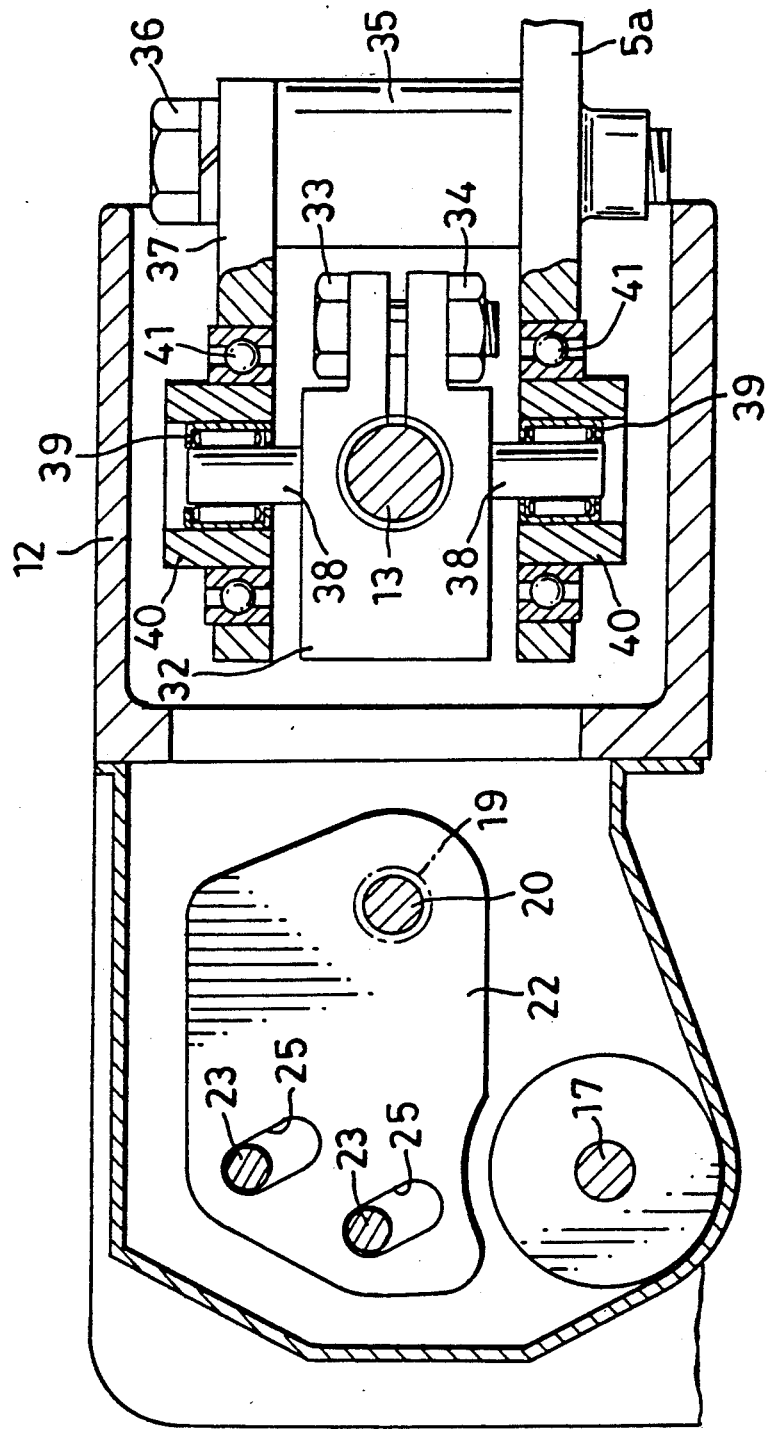
FIG. 4 is an enlarged view in section taken along the line 4—4 in FIG. 2.
Figure 5:
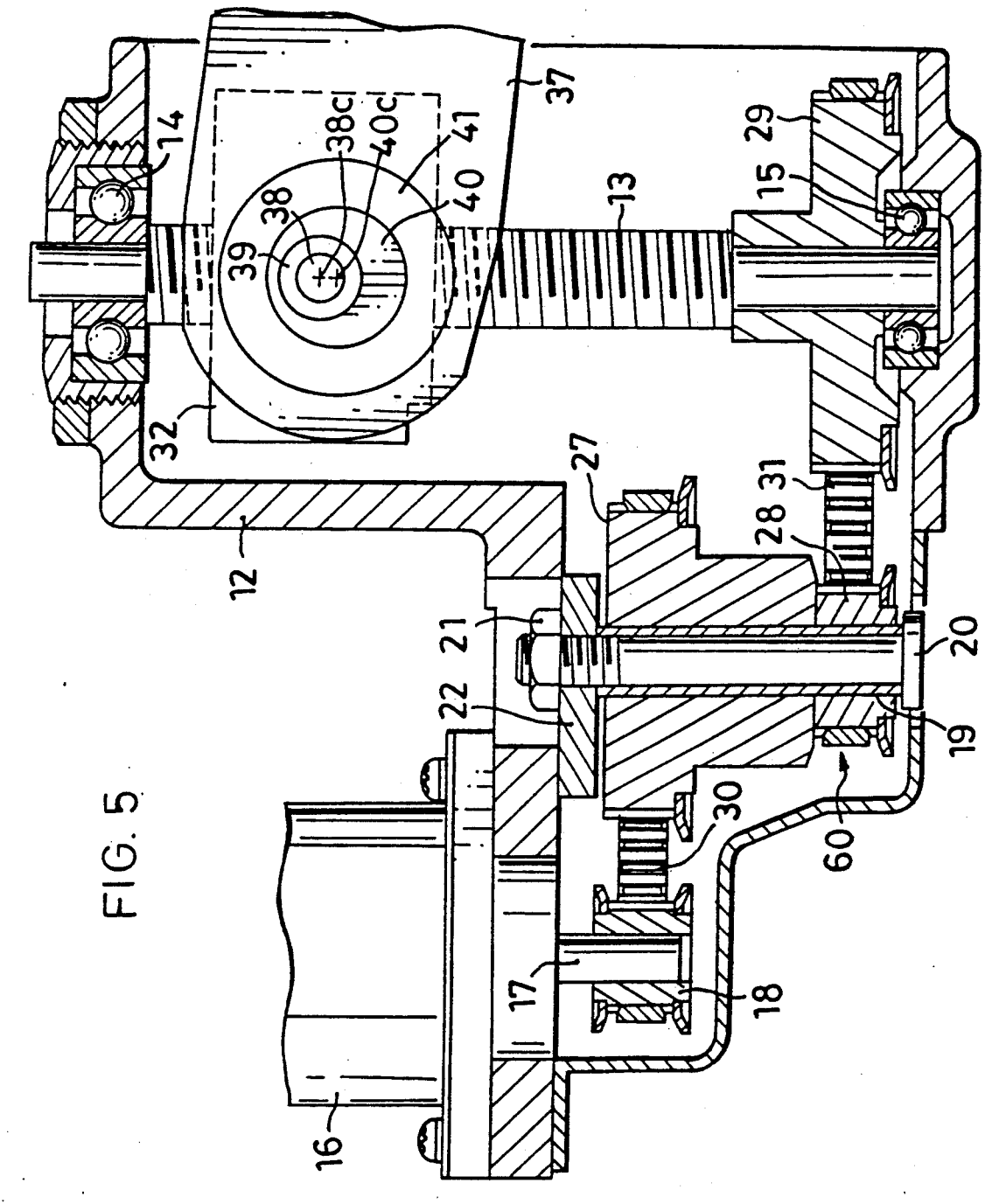
FIG. 5 is a view in section taken along the line 5—5 in FIG. 3.

The drawings show a motor-operated tilt steering device embodying the invention for use in motor vehicles. The terms "front" and "rear" as used herein refer respectively to the left side and the right side of FIGS. 1 and 2, and the terms "right" and "left" refer respectively to the upper side and the lower side of FIG. 1.

A bracket 1 is fixed to the body of a motor vehicle (not shown). When seen from above, the fixed bracket 1 is generally U-shaped and open rearward. A lower column 2 is secured to the front end of the bracket 1. The front end of the lower column 2 is also fixed to a suitable portion of the vehicle body by a fastening member 3. A lower steering shaft (lower shaft) 4 extends through and is rotatably supported by the lower column 2. Although not shown, the front end of the lower shaft 4 is connected to a steering gear.

A tilt bracket 5 is pivotally movably attached at its rear portion to the rear portion of the fixed bracket 1 with two connecting pins (special bolts) 6. When seen from above, the tilt bracket 5 is generally U-shaped and has an open front end. The tilt bracket 5 has a left side portion 5a disposed on the outer side of the left side portion 1a of the fixed bracket 1 and a right side portion 5b positioned on the inner side of the right side portion 1b of the bracket 1. An upper column 7 is secured to the rear end of the tilt bracket 5. An upper steering shaft (upper shaft) 8 extends through and is rotatably supported by the upper column 7. A steering wheel 9 is attached to the rear end of the upper shaft 8. The front end of the upper shaft 8 is connected to the rear end of the lower shaft 4 by a universal joint 10. The center of the universal joint 10 is positioned at the center of pivotal movement of the tilt bracket 5, i.e., on the center line 6c of the connecting pins 6. A coiled tension spring 11 is connected between the front-end upper portion of the fixed bracket 1 and the rear-end upper portion of the tilt bracket 5 for biasing the tilt bracket 5 into an upward pivotal movement. Although not shown, the upper column 7 is provided with means for telescopically driving the upper shaft 8 when required.

A housing 12 is secured to the outer side of the left side portion 1a of the fixed bracket 1. A screw shaft 13 extending generally vertically is rotatably supported at its opposite ends by ball bearings 14, 15 on the rear portion of the housing 12. A tilting electric motor 10 is secured to the upper side of a front wall of the housing 12 in parallel to the screw shaft 13 and oriented generally downward. The motor 16 has a shaft 17 projecting downward through the housing wall and fixedly carrying a small pulley 18 at its lower end. The housing 12 has accommodated therein an intermediate pulley assembly 60 interposed between the motor shaft 17 and the screw shaft 13 and comprising a large pulley 27 and a small pulley 28 which are joined together with a collar 19 and unillustrated pins. The assembly 60 is rotatably attached to a base plate 22 by a bolt 20 and a nut 21. The base plate 22 is fastened to the housing 12 with bolts 23 and is adjustable in position utilizing slots 25. A large pulley 29 is fixed to the lower portion of the screw shaft 13. A timing belt 30 is reeved around the small pulley 18 on the motor 16 and the large pulley 27 of the intermediate pulley assembly 60. Another timing belt 31 is reeved round the small pulley 28 of the assembly 60 and the large pulley 29 on the screw shaft 13.

A screw nut 32 is in meshing engagement with the screw shaft 13, approximately rectangular parallelepipedal and bifurcated at its rear portion by a slit. The preload on the screw shaft 13 is adjustable by fastening the bifurcated portions with a bolt 33 and a nut 34. The front end of the left side portion 5a of the tilt bracket 5 is positioned at the right side of the screw bracket 32 immediately adjacent thereto. By a tubular spacer 35 and a bolt 36, an arm 37 is spaced from and fixed to an outer part of the left side portion 5a of the tilt bracket 5 close to the front end of the portion 5a. The arm 37 is positioned at the left side of the screw nut 32 immediately adjacent thereto. A pair of pins 38 are integral with the respective right and left sides of the screw nut 32. An eccentric disk 40 is rotatably supported by a needle roller bearing 39 on each of the pins 38 and provided with a ball bearing 41. The eccentric disks 40, 40 are supported by the tilt bracket left side portion 5a and the arm 37, respectively, with each bearing 41 fitted in a hole formed in the portion 5a or arm 37. As will be described later, the eccentric disks 40 serve to absorb the difference in locus between the linear motion of the screw nut 32 and the circular-arc motion of the tilt bracket left side portion 5a and the arm 37.

The right side portion 5b of the tilt bracket 5 has secured thereto a limit switch (LS) actuating plate 42 at its front end, and a position sensor actuating piece 43, which is adjustable in position, close to the pin 6. Fixed to the right side portion lb of the fixed bracket 1 on its inner surface are a pair of stoppers 44, 45 for the right side portion 5b of the tilt bracket 5, a pair of limit switches (LS) 46, 47 opposed to the LS actuating plate 42, and a position sensor 48 opposed to the position sensor actuating piece 43. Each of the stoppers 44, 45 comprises a rubber piece 49, and a contact member 50 and a bolt 51 sandwiching the piece 49 therebetween fixedly. The stopper 44, i.e. "up" stopper, determines the upper limit position of the tilt bracket 5 when it is tilted upward. The stopper 45, i.e. "down" stopper, determines the lower limit position of the bracket 5 when it is tilted downward. The LS 46, i.e. "up" LS, detects the upper limit position of the tilt bracket 5, and the LS 47, i.e. "down" LS, the lower limit position of the tilt bracket 5. The position sensor 48 comprises, for example, a potentiometer for converting to an electric signal the movement of an actuator 52 in pressing contact with the actuating piece 43 to detect the tilt angle of the tilt bracket 5. The output signal of the position sensor 48 is used, for example, in such a case where the steering wheel 9 is so controlled as to be automatically set to its usual operating position which is stored in a memory.

With the tilt steering device described, the rotation of the motor 16 is transmitted to the screw shaft 13 on a speed reduction by the timing belts 30, 31 and the pulleys 18, 27, 28, 29, whereby the screw nut 32 is moved along the screw shaft 13 upward or downward. The upward or downward movement of the screw nut 32 is converted to the pivotal movement of the tilt bracket 5 through the eccentric disks 40, tilting the steering wheel 9 upward or downward. With reference to FIG. 7, the upward or downward movement of the screw nut 32 is a linear motion, while the pivotal movement of the tilt bracket 5 is a circular motion about the central line 6c of the connecting pins 6. With the movement of the screw nut 32, each eccentric disk 40 rotates about the center line 38c of the pin 38 so that the center line 40c of the eccentric disk 40 is positioned on a circular-arc line centered about the center line 6c of the connecting pins 6, whereby the difference between the loci of the two motions is absorbed to convert the linear motion of the screw nut 32 to the pivotal movement of the tilt bracket 5. At this time, the tilt angle of the tilt bracket 5 is detected by the position sensor 48. Further the LS 46 or 47 operates to stop the tilt bracket 5 at its upper limit position or lower limit position. Even if the position sensor 48 and the LS 46 or 47 break, failing to accurately stop the tilt bracket 5 at its upper limit position or lower limit position, the tilt bracket 5 comes into contact with the stopper 44 or 45 and is thereby stopped. This obviates the objectionable likelihood that the screw nut 32 will come into biting engagement with thread end portion of the screw nut 13. Further because the rotation of the motor 16 is converted to the pivotal movement of the tilt bracket 5 by the screw shaft 13 and the screw nut 32, the screw shaft 13 will not rotate reversely even if the steering wheel 9 is subjected to an upward or downward load, provided that the shaft 13 and the nut 32 are so designed that the lead angle $\alpha$ of the thread on the shaft 13 and the coefficient of friction $\mu$ between the portions in screwthread engagement have the relationship of $\tan \alpha < \mu$. The arrangement wherein the rotation of the motor 16 is transmitted to the screw shaft 13 through the belts 30, 31 is operable with a diminished noise, while the shaft-to-shaft distance between each pair of opposed pulleys need not be very accurate, permitting quantity production of the present device at a reduced cost.

What is claimed is:
1. A motor-operated tilt steering device including:
a fixed bracket fixed to the body of a vehicle and supporting a lower steering shaft by means of a lower column;
a tilt bracket pivotally movably attached to said fixed bracket, one end of said tilt bracket supporting by an upper column an upper steering shaft connected to said lower steering shaft by a universal joint;
a tilting electric motor attached to said fixed bracket;
speed reduction means for reducing rotational speed of a shaft of said motor; and
conversion means including a screw shaft for converting rotation of said motor shaft to a pivotal movement of said tilt bracket, said screw shaft being attached to said fixed bracket so as to be substantially perpendicular to an axis of said lower column and parallel to said motor shaft;

said speed reduction means including a first pulley attached to said motor shaft, a fourth pulley attached to said screw shaft, an intermediate pulley assembly wherein a second pulley and a third pulley are fixed to rotate together, a first timing belt connecting said first pulley and second pulley, and a second timing belt connecting said third pulley and said fourth pulley;

said conversion means including:

a nut member engaging with said screw shaft so that said nut member is movable along an axial line of said screw shaft as said screw shaft rotates, said nut member including a fixed shaft having an axial line perpendicular to said axial line of said screw shaft; and a bearing assembly secured to the outer end of said tilt bracket, said bearing assembly including a large bearing supported by said tilt bracket, an eccentric collar fixed inside said large bearing, and a small bearing fixed on said eccentric collar at its eccentric position, said small bearing engaging said fixed shaft provided on said nut member;

whereby said eccentric collar generates a turning point for said tilt bracket relative to said nut member when said nut member is moved as said screw shaft rotates to thereby convert linear movement of said nut member into angular movement of said tilt bracket so that the upper column supported by said tilt bracket is held in a desired angular position.

2. A motor-operated tilt steering device as defined by claim 1, wherein said intermediate pulley assembly is rotatably mounted to a base plate and said base plate includes at least one slot for fixing and adjustably positioning said base plate relative to said fixed bracket.

3. A motor-operated tilt steering device as defined by claim 1, wherein one of each of said first and second pulleys and said third and fourth pulleys is a pulley having a collar at both sides of its respective timing belt and the other of each of said pulleys is a pulley having a collar at only one side of its respective timing belt.

* * * * *